(12) United States Patent
Zeman (10) Patent No.: US 7,122,823 B2
(45) Date of Patent: Oct. 17, 2006

(54) THICK CLEAR CRYSTAL PHOTOSTIMULABLE PHOSPHOR PLATE FOR X-RAY IMAGING

(75) Inventor: Herbert D. Zeman, Memphis, TN (US)

(73) Assignee: The University of Tennessee Research Foundation, Knoxville, TN (US)

( * ) Notice: Subject to any disclaimer, the term of this patent is extended or adjusted under 35 U.S.C. 154(b) by 9 days.

(21) Appl. No.: 11/053,246

(22) Filed: Feb. 8, 2005

(65) Prior Publication Data

US 2006/0175562 A1   Aug. 10, 2006

(51) Int. Cl.
G03B 42/08 (2006.01)

(52) U.S. Cl. .................................... 250/585

(58) Field of Classification Search ............... 250/585, 250/580, 581, 582, 583, 584, 586, 587
See application file for complete search history.

(56) References Cited

U.S. PATENT DOCUMENTS

| | | | | |
|---|---|---|---|---|
| 4,517,463 | A * | 5/1985 | Gasiot et al. | 250/585 |
| 4,733,090 | A * | 3/1988 | DeBoer et al. | 250/484.4 |
| 4,778,995 | A * | 10/1988 | Kulpinski et al. | 250/586 |
| 4,988,873 | A * | 1/1991 | Lubinsky et al. | 250/585 |
| 6,307,212 | B1 * | 10/2001 | Huston et al. | 250/580 |
| 6,326,636 | B1 * | 12/2001 | Isoda et al. | 250/586 |
| 2004/0188634 | A1 * | 9/2004 | Maezawa et al. | 250/484.4 |

OTHER PUBLICATIONS

Photostimulable Transparent NACL:CU Single Crystals For Two-Dimensional X-Ray Imaging Sensors. Author: Hidehito Nanto, Takayuki Usuda, Kazuhiko Murayama, and Hideki Sokooshi Electron Device System Research Laboratory, Kanazawa Institute of Technology, 7-1 Oogigaoka, Nonoichimachi, P.O. Kanazawa-South, Ishikawa 921, Japan.

* cited by examiner

Primary Examiner—David Porta
Assistant Examiner—Mark R. Gaworecki
(74) Attorney, Agent, or Firm—Luedeka, Neely & Graham (57) ABSTRACT

A radiation imaging apparatus includes a photostimulable phosphor plate, an x-ray source, a red or infrared laser, and an array of photomultiplier tubes. The x-ray source propagates x-rays toward the plate, which is incident on the plate at a first incidence angle. The x-rays interact with the plate to form a latent image therein. The laser propagates laser radiation toward the plate which is incident on the plate at a second incidence angle. According to the invention, the second incidence angle is equivalent to the first incidence angle at substantially all points on the plate. Based on the interaction of the laser radiation with the latent image in the plate, the plate emits visible image radiation. Thus, the x-ray radiation, which forms the image in the plate, follows the same path within the plate as does the laser radiation. By ensuring that the laser radiation follows the same path through the plate as the x-ray radiation, the invention achieves high spatial resolution in the image detected by the laser. The array of photomultiplier tubes receives the image radiation emitted by the plate and generates an electrical image signal based thereon. Based on this electrical image signal, the image formed in the plate may be displayed on a display device or printed on a printer. The device may also include an aspheric lens attached to the plate that refracts the laser radiation so that it enters the plate at the same incidence angle as the x-ray radiation. Using this lens, the x-ray and laser radiation may enter the plate from opposite sides of the plate and still follow the same path through the plate. Preferably, the photostimulable phosphor plate is formed of barium fluoroiodide—BaFI(Eu).

23 Claims, 3 Drawing Sheets

THICK CLEAR CRYSTAL PHOTOSTIMULABLE PHOSPHOR PLATE FOR X-RAY IMAGING

The present invention was developed at least in part with funding received from the National Institutes of Health grant number AR41376 and from the National Science Foundation grant number BCS-9108883. The U.S. government may have certain rights in this invention.

FIELD

This invention relates to the field of x-ray imaging devices. More particularly the invention relates to x-ray imaging systems incorporating thick clear crystal photostimulable plates.

BACKGROUND

The recording of radiation images is carried out in various fields. For example, X-ray images have long been used in making medical diagnoses involving investigation of a diseased body part or an injury. Portal imaging devices have been used for the verification of beam placement and patient positioning during radiotherapy. Also, radiation images have been used in industrial applications such as for non-destructive inspection of substances.

Prior techniques for recording x-ray images have included storing the image on a photostimulable phosphor sheet and then exposing the sheet to stimulating energy, such as from a laser beam. The photostimulable phosphor sheet consists of a powder of small photostimulable phosphor crystals bound to a plastic sheet with a clear binder. The laser radiation causes the sheet to emit light in proportion to the amount of energy stored when the sheet is exposed to the x-ray radiation through a process known as photostimulable luminescence (PSL). The light emitted by the photostimulable phosphor sheet is photoelectrically detected and converted into an electric image signal. The electric image signal is used to reproduce and store a digital image which can then be displayed as a visible image, such as on a cathode ray tube (CRT) display device or a liquid crystal (LCD).

Other techniques include capturing the x-ray image using a scintillating screen consisting of a powdered phosphor such as gadolinium oxysulfide ($Gd_2O_2S$) or a structured phosphor such as cesium iodide activated by thallium (CsI:Tl), both of which promptly convert the x-ray image into a visible light image. This image of visible light is then typically directed onto a detector array such as a charge-coupled device (CCD) from which a digital image can be read for immediate display or storage. Various techniques utilizing mirrors, lenses, and fiber optic components have been developed to demagnify the light image from the field of view in a patient (typically 35×43 cm) to the size of commercially available CCDs (approximately 5×5 cm or smaller). In some cases, clusters of CCDs (e.g. 2×2) have been used to reduce the demagnification required. These configurations are collectively referred to herein as the screen/CCD technique.

Still other prior techniques involved capturing the x-ray image in a clear thick scintillating crystal plate by coupling the scintillator plate, such as CsI:Tl, to a slow-scan cooled CCD camera with a high-speed lens (referred to herein as the plate/lens/CCD technique).

Although systems based on some of these techniques are commercially available, performance limits leave ample room for improvements, and trade-offs between critical image quality parameters continue to be required.

A fundamental limitation of PSL-based systems is the scattering or diffusion of the scanning laser beam as it penetrates deeper into the photostimulable phosphor sheet causing a degradation in the spatial resolution of the final image. Consequently, a trade-off must be made between quantum detection efficiency (QDE) which can be increased by making the phosphor sheet thicker and the modulation transfer function (MTF) which is improved by making the phosphor sheet thinner.

Systems incorporating the screen/CCD or the plate/lens/CCD techniques encounter a fundamental limitation due to the image demagnification required which results in low light collection efficiency causing a secondary quantum sink at this point in the imaging chain. Even using the largest CCD chips and fastest lenses available, it is not possible to collect more than about 0.2% of the light emitted by the scintillator plate under x-ray bombardment. The consequence of this inherent limitation is reduced image quality, such that for diagnostic x-ray imaging, the performance of these devices is inferior to both traditional screen-film and PSL-based systems.

Even in portal imaging applications, the plate/lens/CCD technique has some severe disadvantages. (1) The CCD device required is large, expensive, and sensitive to radiation, thus requiring heavy and bulky radiation shielding. (2) The fast lens needed for x-ray quantum limited performance has a limited depth of focus which causes a trade off between QDE and MTF. Although this tradeoff is far less severe than it is for conventional and photostimulable powder phosphor screens, it is still present and puts a limit on the thickness of the crystal plate that can be used and still achieve high spatial resolution. (3) The CCD camera has a limited well depth, and many dozens of images would have to be acquired during a radiation exposure to prevent saturation. To prevent loss of any of the available dose for imaging, two CCD cameras or a single frame transfer CCD camera would be needed, adding to the expense and size of the system. (4) The CCD camera integrates the light emission data which has to be read out during the radiation exposure. This makes the CCD camera output subject to the effects of any radiation reaching the camera from the x-ray accelerator. Since even the best shielding can reduce the radiation exposure to the camera by only about a factor of 4, radiation noise would be a major problem for a plate/lens/CCD system. (5) To achieve the best spatial resolution, the CCD camera has to view the scintillator plate from the entrance side. This requires a 45 degree mirror, which means that the patient has to be quite far away from the scintillator plate. This reduces the spatial resolution due to the accelerator focal spot size and increases the required size of the expensive scintillator plate needed to achieve an adequate field of view.

What is needed, therefore, is an x-ray imaging system having better spatial resolution, higher quantum efficiency and higher signal-to-noise ratio, and which contributes little or no radiation noise.

SUMMARY

The above and other needs are met by a radiation imaging apparatus comprising a thick clear single crystal photostimulable phosphor plate with optically flat entrance and exit faces, a first radiation source such as an x-ray tube or accelerator, a second radiation source such as a red or infrared laser, and a detection device such as an array of photomultiplier tubes. The first radiation source propagates first radiation, such as x-rays, toward the plate, which radiation is incident on the plate at a first radiation incidence angle. The first radiation exposes the plate to form a latent image therein. The second radiation source propagates second radiation, such as laser radiation, toward the plate. The second radiation is incident on the plate at a second radiation incidence angle. According to the invention, the second radiation incidence angle is equivalent to the first radiation incidence angle at substantially all points on the plate. Based on the stimulation of the second radiation with the image in the plate, the plate emits PSL image radiation. Thus, the first radiation, which forms the latent image in the plate, follows the same path within the plate as does the second stimulating radiation which causes the image to emit the PSL image radiation. The detection device receives the PSL image emitted by the plate and generates an electrical image signal based thereon. Based on this electrical image signal, the image formed in the plate may be displayed on a display device, printed on a printer or stored in a computer memory.

In a most preferred embodiment, the imaging device includes an aspheric plano-convex plastic lens or a plastic Fresnel lens attached to the plate that refracts the second radiation so that the second radiation enters the plate at substantially the same incidence angle as the first radiation. Using this lens, the first and second radiation may enter the plate from opposite sides of the plate and still follow the same path through the plate.

Also in a preferred embodiment, the thick clear photostimulable phosphor plate is formed of a single crystal of barium fluoroiodide doped with europium—BaFI(Eu).

The imaging device of the present invention completely eliminates many of the problems associated with the prior x-ray imaging systems by replacing prior art thick clear crystal CsI(Tl) scintillating plates with a thick clear crystal photostimulable phosphor plate of barium fluoroiodide in a eutectic mixture (BaFI(Eu)). The readout of the photostimulable plate is accomplished with a scanning red or infrared laser beam, and the photostimulated light is collected using photomultiplier tubes. High spatial resolution is obtained by ensuring that the laser beam follows the same path through the thick plate as the original x-ray beams from the x-ray accelerator. In a preferred embodiment, the path overlap is achieved by placing the laser readout on the exit side of the photostimulable phosphor plate and using an aspheric field lens or a Fresnel lens bonded to the phosphor plate. The focusing properties of the lens are chosen to ensure that the laser beam is bent to travel along substantially the same path as the x-ray beam. Since the laser beam is highly collimated, having a very high f number, the slight defocusing effect that the field lens has on the laser beam has a negligible effect on spatial resolution. Because a large fraction, such as 20%, of the light emitted from the plate is collected by the array of photomultiplier tubes and light pipes, no significant secondary light quantum sink exists, even in the diagnostic energy range. Hence, the invention is useful in chest radiography and other examinations where high x-ray energy is needed, and where powder-based intensifying screens or photostimulable phosphor screens have low QDE.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The present invention is directed to an imaging apparatus that incorporates a clear thick single-crystal photostimulable phosphor plate on which a radiation image, such as an x-ray image, can be recorded. After the plate is exposed to the radiation image, the plate is exposed to stimulating energy, such as from a laser beam. The stimulating energy causes the plate to emit PSL light in proportion to the amount of energy stored therein during its exposure to the radiation image. The light emitted by the photostimulable phosphor plate when stimulated by the laser energy is photoelectrically detected and converted into an electric image signal. The electric image signal is then used to display a visible image on a display device or to reproduce a visible image on film, such as using a laser printer, or the image signal can be stored in a computer memory.

Figure 1:
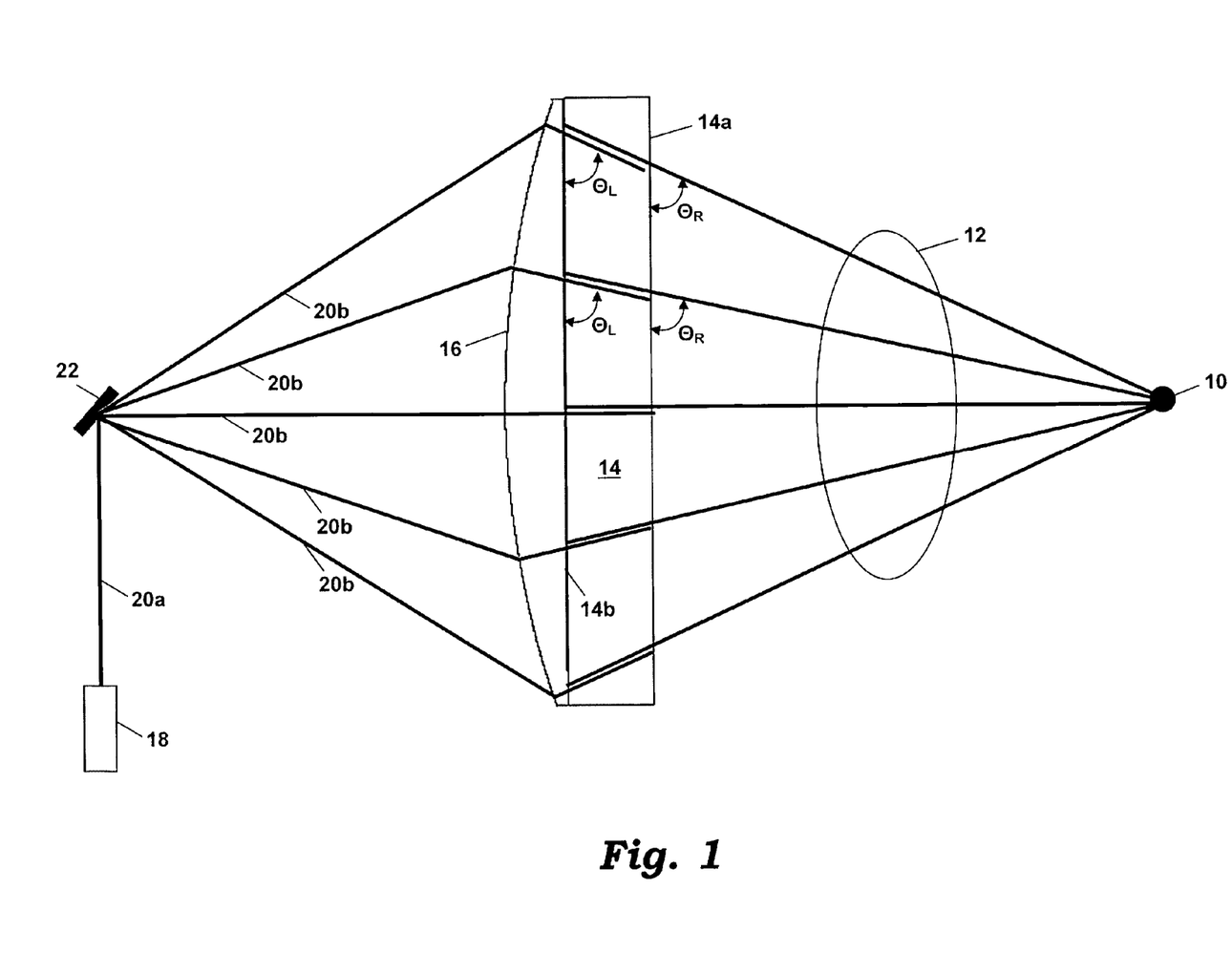
FIG. 1 depicts components of an x-ray imaging system according to a preferred embodiment of the invention.

FIG. 1 depicts a preferred embodiment of a portion of such an imaging apparatus. The apparatus includes a radiation source 10, such as a linear accelerator or an x-ray tube for producing x-ray radiation. In the preferred embodiment, the source 10 also includes a collimator to limit the size of the x-ray beam from the source 10. In many applications of the imaging apparatus, the radiation from the source 10 passes through an object 12, such as a portion of a person's body undergoing medical diagnosis.

After passing through the object 12, the radiation impinges upon a photostimulable phosphor plate 14 that acts as an x-ray detector by converting the incident x-ray radiation into a stored latent image. In the preferred embodiment of the invention, the plate 14 is a clear single-crystal sheet formed from barium fluoroiodide doped with europium—BaFI(Eu). When later exposed to the red or near infrared laser light, the plate 14 emits blue light that can be detected by an array of photomultiplier tubes. As discussed in more detail below, the photomultiplier tubes preferably have filters that are nontransmissive to the laser light and transmissive to the blue photostimulated light.

Preferably, the diameter of the plate 14 is about 20 to 40 centimeters, and its thickness is about 0.5 to 50 millimeters. The advantage of a plate this thick is that it provides a longer path for the x-ray and charged particle interactions within the plate 14, thereby significantly improving the QDE without compromising the spatial resolution. It has been determined that QDE and detective quantum efficiency (DQE) improve with increasing plate thickness. Generally, the upper limit of plate thickness is determined by the acceptable spatial resolution, weight, and cost. As the thickness of the plate increases, it becomes more difficult to maintain both adequate depth of field and high light collection efficiency. Taking all of these factors into consideration, the inventor has determined that the plate 14 may be as thick as about 50 millimeters with negligible loss of spatial resolution.

If necessary for structural support, the plate 14 could be glued or clamped to an optically clear plate, such as a glass or Lucite plate. Alternatively, the plate 14 could be sandwiched between two glass or Lucite plates for support and to create an optically flat light exit face.

As shown in FIG. 1, the side of the plate 14 on which the x-ray radiation is incident is referred to herein as the entry face 14a and the opposite side is referred to as the exit face 14b. At all points on the entry face 14a, the radiation from the source 10 is incident at an angle $\theta_R$. Since the entry face 14a and the exit face 14b are parallel, the radiation from the source 10 is also incident on the exit face 14b at the angle $\theta_R$.

Attached to the exit face 14b of the plate 14 is a lens 16, such as a plano-convex aspheric field lens or Fresnel lens. In the preferred embodiment, the planar side of the lens 16 is bonded to the exit face 14b by an optically transparent bonding agent. As shown in FIG. 1, the lens 16 preferably has a diameter substantially the same as the diameter of the plate 14.

The apparatus includes a light source 18, which in the preferred embodiment is a laser that emits a beam 20a in the visible red or infrared wavelengths. The beam 20a is reflected from a mirror assembly 22 that directs the reflected beam 20b toward the lens 16. In the preferred embodiment, the mirror assembly 22 comprises a pair of electrically driven galvanometer mirrors, one of which deflects the laser beam vertically, and one of which deflects the beam horizontally. As shown in FIG. 1, the lens 16 bends the reflected beam 20b such that the beam is incident on the exit side 14b of the plate 14 at an angle $\theta_L$. According to the invention, the angle $\theta_L$ is substantially equal to the angle $\theta_R$, which is the angle of incidence of the x-ray radiation from the source 10.

Although the invention is not limited to any particular theory of operation, it is believed that the x-rays incident on the clear thick photostimulable phosphor plate 14 create a latent image of excited phosphor atoms in the plate 14. These excited atoms emit blue light in all directions when they are stimulated with red or infrared light from the laser 18. Using an array of photomultiplier tubes and light pipes (depicted in FIG. 2), it is possible to collect and measure a significant fraction of the emitted blue light photons.

Figure 2:
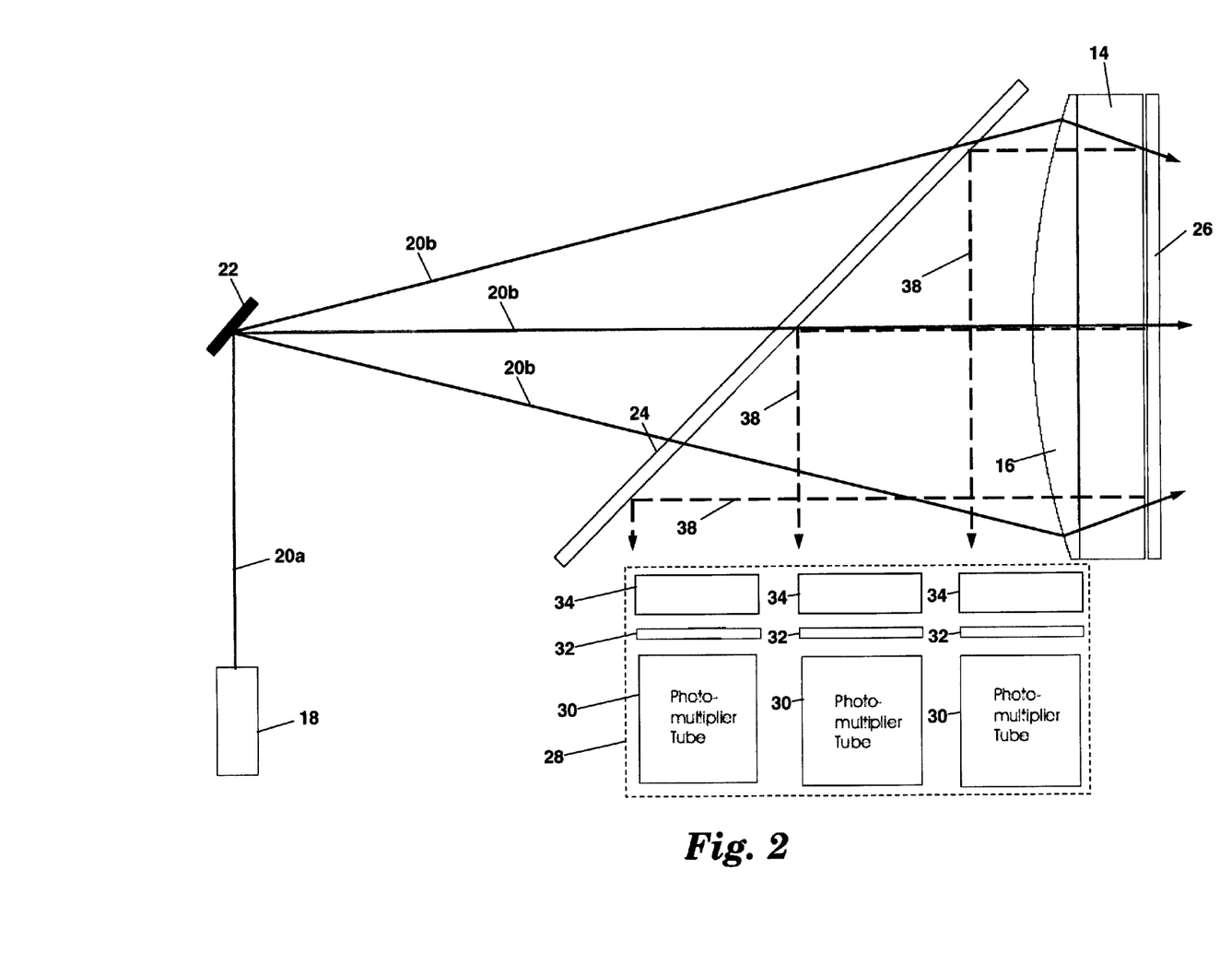
FIG. 2 depicts an x-ray imaging system according to a preferred embodiment of the invention.

So as not to overcomplicate FIG. 1, several components of the readout portion of the imaging apparatus are not depicted therein. A preferred embodiment of the imaging apparatus including the readout components is shown in FIG. 2. In this embodiment, a dichroic mirror 24, such as a red transmitting and blue reflecting dichroic mirror, is disposed between the mirror assembly 22 and the lens 16. The dichroic mirror 24 is preferably set at an angle of 45° with respect to the exit side 14b of the plate 14. A second dichroic mirror 26 is provided adjacent the entry side 14a of the plate 14, and is substantially parallel to the entry side 14a.

As shown in FIG. 2, after refraction by the lens 16, the beam 20b interacts with the excited atoms containing electrons trapped in metastable states within the plate 14 to cause the plate 14 to emit visible light in proportion to the latent x-ray image recorded in the plate. In this manner, the laser energy causes the plate 14 to emit a visible light image 38 that is substantially a "copy" of the x-ray image. The visible light image 38, which generally radiates in all directions within the plate, is reflected from the mirror 26. The visible light image 38 passes through the lens 16, is reflected by the mirror 24 and is incident upon a detection array 28. As indicated in FIG. 2, the position at which the visible light image 38 is incident on the detection array 28 generally depends upon the position at which the beam 20b is incident on the plate 14. Thus, as the image in the plate 14 is scanned by the beam 20b, the visible light image is transferred to the detection array 28.

In the preferred embodiment of the invention, each element of the detection array 28 comprises a photomultiplier tube 30, band pass filter 32 and light pipe 34. Preferably, the detection array 28 is a two-dimensional square array comprising 9–16 elements arranged to capture light emitted in different directions. The photomultiplier tubes 30 are generally large enough to collect a substantial fraction of the photostimulated light emitted from the plate 14. The photomultiplier tubes 30 generate electrical image signals in relation to the received visible light image 38. The combination of the electrical image signals from all of the tubes 30 in the array 28 produces a composite electrical signal representing a portion of the x-ray image at the position on the plate 14 illuminated by the laser beam. This composite signal is used to generate a displayable version of the x-ray radiation image, such as on a LCD, CRT or other display device, or on a printing device, or for storage in a computer memory.

In the preferred embodiment, the image 38 is captured one pixel at a time by the detection array 28 as the beam 20b scans across the plate 14. Generally, the position of each captured pixel depends on the position of the laser beam 20b which is determined by the position of the two galvanometer mirrors of the mirror assembly 22. Preferably, each pixel of the image 38 is captured simultaneously by all of the elements of the detection array 28. Thus, the number of elements in the detection array 28 is not necessarily the same as the number of pixels in the image 38. The detection array 28 preferably covers a large enough area to collect sufficient light from the image 38 so as to avoid a secondary quantum sink.

Figure 3:
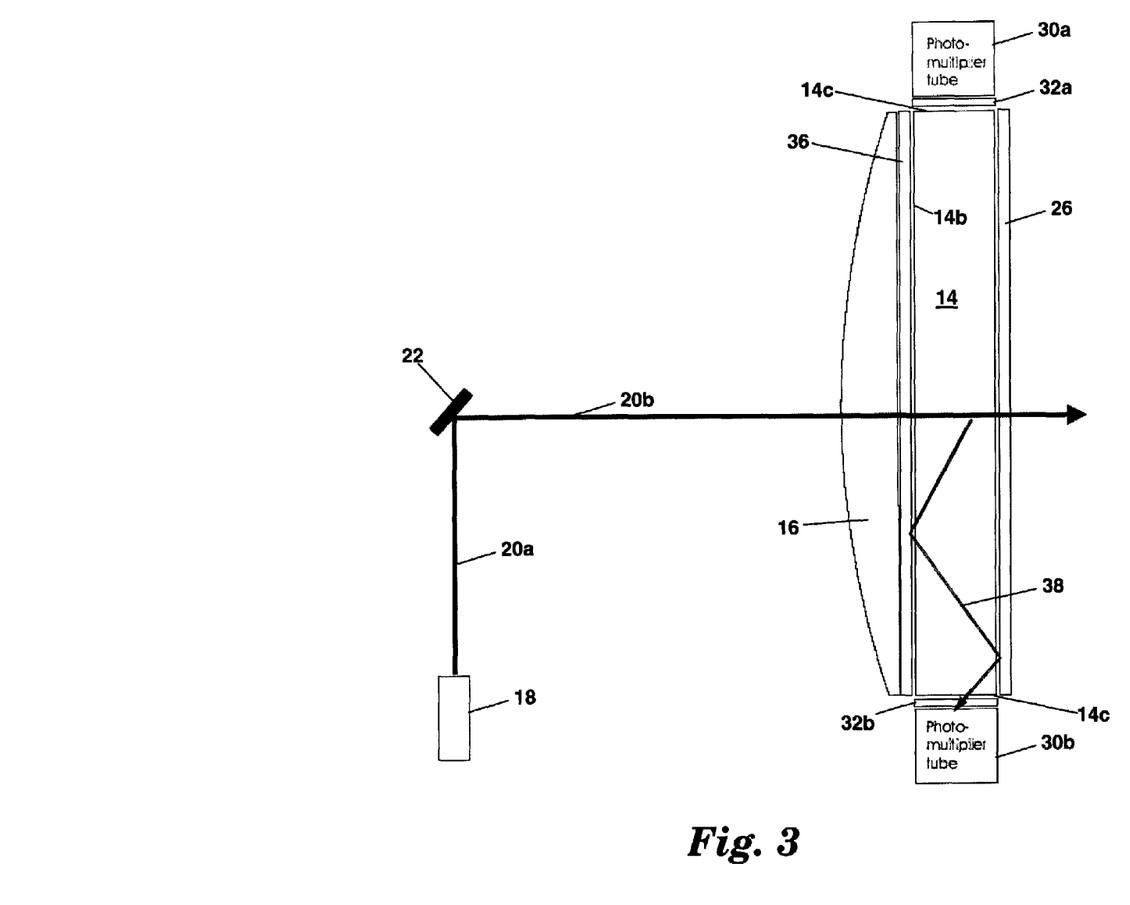
FIG. 3 depicts an x-ray imaging system according to an alternative embodiment of the invention.

An alternative embodiment of the invention is depicted in FIG. 3. In this embodiment, a dichroic mirror 36 is positioned between the lens 16 and the photostimulable plate 14, adjacent the exit face 14b of the plate 14. The detection array 28 of this embodiment comprises photomultiplier tubes 30a and 30b and filters 32a and 32b disposed at opposing end faces 14c of the plate 14. As shown in FIG. 3, after refraction by the lens 16, the beam 20b passes through the mirror 36, and interacts with the excited atoms within the plate 14. The blue light 38 generated within the plate 14 is reflected back and forth between the mirror 36 and the mirror 26 as the light 38 propagates through the plate 14. Ultimately, the blue light 38 passes through the end faces 14c of the plate 14 and is incident upon one or more of the photomultiplier tubes 30a–30b of the detection array 28. In this embodiment, the plate 14 and the opposing mirrors 26 and 36 act as a waveguide for the visible light image 38.

The invention as described herein eliminates many if not all of the problems associated with prior art techniques for at least the following reasons. First, the laser 18 and photomultiplier tubes 30 can be made radiation hard so that no shielding is necessary for radiation protection of the equipment.

Second, because the laser beam 20a is highly collimated and of very high f number, the trade off between QDE and MTF is essentially eliminated. Accordingly, the invention can incorporate a much thicker phosphor plate 14 with little or no loss of spatial resolution.

Third, the phosphor plate 14 used in the invention has a much larger storage capacity than prior art CCD cameras. Thus, the plate 14 can store essentially all of the x-ray image produced by the entire radiation exposure of the object 12. A single readout of the plate 14, performed after the radiation exposure is finished, yields an x-ray image with extremely high signal to noise ratio and no contribution of radiation noise or light quantum noise.

Fourth, because the recording of the x-ray image is performed after the radiation exposure of the plate 14 is complete, the invention requires no radiation shielding, and no contribution of radiation noise is present in the recorded image.

Fifth, the high f number of the collimated laser beam makes it possible to record the image from the exit face 14b of the plate 14 using an appropriate aspheric field lens, such as the lens 16. Hence, the plate 14 can be positioned closer to the object 12 during the x-ray radiation process, thereby allowing for higher spatial resolution and the use of a phosphor plate of smaller diameter.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A radiation imaging apparatus comprising:
   a photostimulable phosphor plate:
   a first radiation source for propagating first radiation in a first radiation path toward the plate, such that the first radiation is incident on the plate at a first radiation incidence angle, the first radiation stimulating the plate to form an image within the plate;
   a second radiation source for propagating second radiation in a second radiation path toward the plate, such that the second radiation is incident on the plate at a second radiation incidence angle;
   the photostimulable phosphor plate for emitting image radiation in a third radiation path, the image radiation based on interaction of the second radiation with the image in the plate;
   a lens disposed in the second radiation path for refracting the second radiation such that the second radiation incidence angle is substantially equivalent to the first radiation incidence angle at multiple points on the plate, wherein the lens is also disposed in the third radiation path for receiving and transmitting the image radiation; and
   a detection device disposed in the third radiation path for receiving the image radiation from the lens and for generating an electrical image signal based on the image radiation.

2. The radiation imaging apparatus of claim 1 wherein:
   the photostimulable phosphor plate has a substantially optically flat entry face and an opposing substantially optically flat exit face;
   the first radiation source is disposed in relation to the plate such that the first radiation is incident first on the entry face of the plate, travels through the plate and is then incident on the exit face of the plate;
   the second radiation source is disposed in relation to the plate such that the second radiation is incident first on the exit face of the plate, travels through the plate and is then incident on the entry face of the plate.

3. The radiation imaging apparatus of claim 2 wherein the detection device is disposed in relation to the plate such that the detection device receives the image radiation emitted from the exit face of the plate.

4. The radiation imaging apparatus of claim 1 wherein the lens is disposed adjacent the exit face of the plate.

5. A radiation imaging apparatus comprising:
   a photostimulable phosphor plate;
   a first radiation source for propagating first radiation in a first radiation path toward the plate, such that the first radiation is incident on the plate at a first radiation incidence angle, the first radiation stimulating the plate to form an image within the plate;
   a second radiation source for propagating second radiation in a second radiation path toward the plate, such that the second radiation is incident on the plate at a second radiation incidence angle, where the second radiation incidence angle is substantially equivalent to the first radiation incidence angle at multiple points on the plate;
   the photostimulable phosphor plate for emitting image radiation in a third radiation path, the image radiation based on interaction of the second radiation with the image in the plate;
   a detection device disposed in the third radiation path for receiving the image radiation from the plate and for generating an electrical image signal based on the image radiation; and
   a first mirror disposed in the third radiation path for reflecting the image radiation toward the detection device.

6. The radiation imaging apparatus of claim 5 wherein the first mirror is substantially reflective to the image radiation and is substantially transparent to the second radiation.

7. The radiation imaging apparatus of claim 1 further comprising a mirror assembly disposed in the second radiation path for reflecting the second radiation toward the plate.

8. The radiation imaging apparatus of claim 7 wherein the mirror assembly further comprises two scanning mirrors for scanning the second radiation vertically and horizontally across the plate.

9. The radiation imaging apparatus of claim 1 wherein the first radiation source further comprises an x-ray radiation source.

10. The radiation imaging apparatus of claim 1 wherein the second radiation source further comprises a laser.

11. The radiation imaging apparatus of claim 1 wherein the detection device further comprises an array of photomultiplier tubes for generating electrical image signals based on the image radiation.

12. The radiation imaging apparatus of claim 10 wherein the detection device further comprises one or more filter devices that are substantially transmissive to the wavelength of the image radiation and substantially nontransmissive to other wavelengths.

13. The radiation imaging apparatus of claim 1 wherein the photostimulable phosphor plate further comprises a thick optically-clear single-crystal plate formed of barium fluoroiodide.

14. A radiation imaging apparatus comprising:
    a photostimulable phosphor plate;
    a first radiation source for propagating first radiation in a first radiation path toward the plate, such that the first radiation is incident on the plate at a first radiation incidence angle, the first radiation stimulating the plate to form an image within the plate;
    a second radiation source for propagating second radiation in a second radiation path toward the plate, such that the second radiation is incident on the plate at a second radiation incidence angle;

the photostimulable phosphor plate for emitting image radiation in a third radiation path, the image radiation based on interaction of the second radiation with the image in the plate;

an aspheric lens disposed in the second radiation path for refracting the second radiation such that the second radiation incidence angle is substantially equivalent to the first radiation incidence angle at multiple points on the plate; and a detection device disposed in the third radiation path for receiving the image radiation from the plate and for generating an electrical image signal based on the image radiation.

15. A radiation imaging apparatus comprising:

a photostimulable phosphor plate;

a first radiation source for propagating first radiation in a first radiation path toward the plate, such that the first radiation is incident on the plate at a first radiation incidence angle, the first radiation stimulating the plate to form an image within the plate, wherein the first radiation source is disposed in relation to the plate such that the first radiation is incident first on the entry face of the plate, travels through the plate and is then incident on the exit face of the plate;

a second radiation source for propagating second radiation in a second radiation path toward the plate, such that the second radiation is incident on the plate at a second radiation incidence angle, where the second radiation incidence angle is substantially equivalent to the first radiation incidence anile at multiple points on the plate wherein the second radiation source is disposed in relation to the plate such that the second radiation is incident first on the exit face of the plate, travels through the plate and is then incident on the entry face of the plate;

the photostimulable phosphor plate for emitting image radiation in a third radiation path, the image radiation based on interaction of the second radiation with the image in the plate, wherein the photostimulable phosphor plate has a substantially optically flat entry face and an opposing substantially optically flat exit face;

a detection device disposed in the third radiation path for receiving the image radiation from the plate and for generating an electrical image signal based on the image radiation; and mirror disposed adjacent the entry face of the plate for reflecting the image radiation toward the detection device.

16. The radiation imaging apparatus of claim 15 wherein the mirror is substantially reflective to the image radiation and is substantially transparent to the first radiation.

17. A radiation imaging apparatus comprising:

a photostimulable phosphor plate comprising an optically-clear single-crystal plate formed of barium fluoroiodide having a thickness of at least about 5 mm;

a first radiation source for propagating first radiation in a first radiation path toward the plate, such that the first radiation is incident on the plate at a first radiation incidence angle, the first radiation stimulating the plate to form an image within the plate; and a second radiation source for propagating second radiation in a second radiation path toward the plate, such that the second radiation is incident on the plate at a second radiation incidence angle, where the second radiation incidence angle is substantially equivalent to the first radiation incidence angle at multiple points on the plate;

the photostimulable phosphor plate for emitting image radiation in a third radiation path, the image radiation based on interaction of the second radiation with the image in the plate.

18. A radiation imaging apparatus comprising:

a thick optically clear single crystal photostimulable phosphor plate with substantially optically flat entry and exit faces;

a first radiation source for propagating first radiation toward the plate, such that the first radiation is incident on the entry face of the plate at a first radiation incidence angle, the first radiation stimulating the plate to form an image within the plate;

a second radiation source for propagating second radiation toward the plate, such that the second radiation is incident on the exit face of the plate at a second radiation incidence angle;

a lens for refracting the second radiation such that the second radiation incidence angle is substantially equivalent to the first radiation incidence angle at multiple points on the plate;

the photostimulable phosphor plate for emitting image radiation based on interaction of the second radiation with the image in the plate;

a detection device for receiving the image radiation from the plate and for generating an electrical image signal based on the image radiation;

a first mirror for reflecting the image radiation toward the detection device, where the first mirror is substantially reflective to the image radiation and substantially transparent to the second radiation; and a second mirror disposed adjacent the entry face of the plate for reflecting the image radiation toward the first mirror, wherein the second mirror is substantially reflective to the image radiation and substantially transparent to the first radiation.

19. A radiation imaging apparatus comprising:

a photostimulable phosphor plate formed of barium fluoroiodide and having an entry face and an opposing exit face;

an x-ray radiation source for propagating x-ray radiation toward the plate, such that the x-ray radiation is incident on the plate at an x-ray radiation incidence angle, the x-ran radiation stimulating the plate to form an image within the plate;

a laser radiation source for propagating laser radiation in a laser radiation path toward the plate, such that the laser radiation is incident on the plate at a laser radiation incidence angle:

the photostimulable phosphor plate for emitting image radiation in an image radiation path based on interaction of the laser radiation with the image in the plate:

a lens disposed in the laser radiation path for refracting the laser radiation such that the laser radiation incidence angle is substantially equivalent to the x-ray radiation incidence angle at multiple points on the plate, wherein the lens is also disposed in the image radiation path for receiving and transmitting the image radiation; and an array of photomultiplier tubes for receiving the image radiation from the lens and for generating electrical image signals based on the image radiation.

20. An imaging apparatus including an optically clear photostimulable phosphor plate for storing a latent image therein, the photostimulable phosphor plate having a thickness of greater than about 2 mm.

21. The imaging apparatus of claim 20 wherein the photostimulable phosphor plate comprises a single crystal.

22. An optically clear photostimulable phosphor plate for use in an imaging apparatus, the photostimulable phosphor plate having a thickness of greater than about 2 mm.

23. The optically clear photostimulable phosphor plate of claim 22 comprising a single crystal.

* * * * *

UNITED STATES PATENT AND TRADEMARK OFFICE
CERTIFICATE OF CORRECTION

| | | |
|---|---|---|
| PATENT NO. | : 7,122,823 B2 | Page 1 of 1 |
| APPLICATION NO. | : 11/053246 | |
| DATED | : October 17, 2006 | |
| INVENTOR(S) | : Herbert D. Zeman | |

It is certified that error appears in the above-identified patent and that said Letters Patent is hereby corrected as shown below:

Column 1, line 8, delete the word "may"; column 1, line 9, delete the word "have" and insert the word --has--.

Signed and Sealed this

Fourth Day of May, 2010

David J. Kappos
*Director of the United States Patent and Trademark Office*